United States Patent
Schünemann

(10) Patent No.: US 12,525,737 B2
(45) Date of Patent: Jan. 13, 2026

(54) ELECTRIC VEHICLE HAVING A CHARGING FLAP MODULE

(71) Applicant: Dr. Ing. h.c. F. Porsche Aktiengesellschaft, Stuttgart (DE)

(72) Inventor: Alexander Schünemann, Fellbach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 732 days.

(21) Appl. No.: 17/903,091

(22) Filed: Sep. 6, 2022

(65) Prior Publication Data
US 2023/0072653 A1    Mar. 9, 2023

(30) Foreign Application Priority Data
Sep. 6, 2021    (DE) .................... 10 2021 122 948.0

(51) Int. Cl.
*H01R 13/453*    (2006.01)
*B60L 53/16*    (2019.01)

(52) U.S. Cl.
CPC .......... *H01R 13/4534* (2013.01); *B60L 53/16* (2019.02); *H01R 2201/26* (2013.01)

(58) Field of Classification Search
CPC .. H01R 13/4534; H01R 2201/26; B60L 53/16
USPC ....................................................... 320/109
See application file for complete search history.

(56) References Cited

U.S. PATENT DOCUMENTS

| | | | | |
|---|---|---|---|---|
| 8,317,376 B2* | 11/2012 | Hook | ................. | B60Q 1/00 |
| | | | | 362/540 |
| 2010/0026238 A1* | 2/2010 | Suzuki | ................. | B60Q 3/30 |
| | | | | 320/109 |
| 2015/0137755 A1* | 5/2015 | Sadano | ................. | B60L 53/16 |
| | | | | 320/109 |
| 2015/0191093 A1* | 7/2015 | Yamamaru | ........... | B60L 53/16 |
| | | | | 320/109 |
| 2015/0375630 A1 | 12/2015 | Jeong et al. | | |

(Continued)

FOREIGN PATENT DOCUMENTS

| | | |
|---|---|---|
| CN | 111776082 A | 10/2020 |
| CN | 111907607 A | 11/2020 |

(Continued)

OTHER PUBLICATIONS

Swedish Office Action for Application No. 2251021-8, dated Mar. 29, 2023, 6 pages.

*Primary Examiner* — Suresh Memula
(74) *Attorney, Agent, or Firm* — Buchanan Ingersoll & Rooney PC

(57) ABSTRACT

An electric vehicle has a charging flap module. The electric vehicle includes a body having a body interior, which has a body element having an outer skin. The body element has an element opening, in which a charging cradle of the charging flap module is arranged. The charging cradle is designed to be fixed to the body and to incorporate a charging flap. The charging flap is designed to be movable in a guided manner between an open position and a closed position for opening and closing a cradle opening of the charging cradle. For guiding the charging flap, the charging cradle includes at least one guide rail, which is arranged in the charging flap module integrated into the housing so that it is protected against penetrating dirt and/or water.

12 Claims, 3 Drawing Sheets

(56) References Cited

U.S. PATENT DOCUMENTS

| | | | |
|---|---|---|---|
| 2016/0137081 A1 | 5/2016 | Takahashi et al. | |
| 2020/0067237 A1* | 2/2020 | Sarraf | G01K 1/18 |
| 2020/0223321 A1* | 7/2020 | Myer | H01R 13/4223 |
| 2020/0307400 A1* | 10/2020 | de Chazal | B60L 53/16 |
| 2021/0063097 A1* | 3/2021 | Hitchcock | B60L 53/16 |
| 2021/0078419 A1* | 3/2021 | Lyon | G01K 1/14 |
| 2021/0246701 A1 | 8/2021 | Shin et al. | |
| 2024/0351457 A1* | 10/2024 | Venkatesan | H01R 13/04 |
| 2025/0058663 A1* | 2/2025 | Venkatesan | B60L 53/16 |
| 2025/0115144 A1* | 4/2025 | Peterson | B60L 53/16 |

FOREIGN PATENT DOCUMENTS

| | | | | |
|---|---|---|---|---|
| DE | 4440814 A1 | 5/1996 | | |
| DE | 102015206715 A1 | 10/2016 | | |
| DE | 202017007349 U1 | 11/2020 | | |
| DE | 202020104347 U1 * | 7/2021 | | H01R 24/78 |
| DE | 102020130235 A1 | 5/2022 | | |
| DE | 102022115913 A1 * | 12/2023 | | H01R 13/5213 |
| EP | 3945643 A1 * | 2/2022 | | H01R 13/4534 |

\* cited by examiner

ELECTRIC VEHICLE HAVING A CHARGING FLAP MODULE

CROSS-REFERENCE TO RELATED APPLICATION

This application claims priority to German Patent Application No. 10 2021 122 948.0, filed Sep. 6, 2021, the content of such application being incorporated by reference herein in its entirety.

FIELD OF THE INVENTION

The invention relates to an electric vehicle having a charging flap module.

BACKGROUND OF THE INVENTION

Electric vehicles having charging flap modules are known. Electrical outlets that are operatively connected to an electromotive drive are formed in the charging flap modules. The electrical outlet is for connection to a plug of a charging station external to the electric vehicle for fueling the electric vehicle. During operation of the electric vehicle, the electrical outlet is closed using a charging flap of the charging flap module.

The charging flap module comprises the charging flap which is primarily movable, in particular translationally, with the aid of a guide rail. In particular, the charging flap module must be secured against penetrating dirt and/or water. In order to implement a secured closing of the charging flap and a secured opening of the charging flap, the guide rail must likewise be protected against water and/or dirt.

DE 10 2015 206 715 A1, which is incorporated herein by reference, reveals an electric vehicle having a charging socket fixedly arranged at an opening of a body element and a charging flap for closing the opening, wherein the charging flap is guided by means of a guide rail formed at the charging socket when the charging flap is moved between an open position and a closed position.

DE 44 40 814 A1, which is incorporated herein by reference, teaches a motor vehicle having an opening and a tank flap for closing the opening, wherein the tank flap is guided with the aid of two fixed guide rails when the tank flap is moved from an open position to a closed position.

US 20160137081 A1, which is incorporated herein by reference, reveals an electric vehicle having a charging socket fixedly arranged at an opening of a body element and a charging flap for closing the opening, wherein the charging flap is divided into two parts and two charging flap parts are guided with the aid of a fixedly arranged guide rail when they are moved between an open position and a closed position.

US 20150375630 A1, which is incorporated herein by reference, discloses an electric vehicle having a charging socket fixedly arranged at an opening of a body element and a charging flap for closing the opening, wherein the charging flap can be pivoted via a pivoting mechanism and can additionally be moved translationally in parallel to the body element via a slidable mounting of the charging flap on the pivoting mechanism.

SUMMARY OF THE INVENTION

Described herein is an electric vehicle having a charging flap module.

An electric vehicle according to aspects of the invention having a charging flap module comprises a body with a body interior having a body element with an outer skin. The body element has an element opening in which a charging cradle of the charging flap module is arranged, wherein the charging cradle is designed to be fixed to the body and to incorporate a charging flap, wherein the charging flap is designed to be movable between an open position and a closed position for opening and closing a cradle opening of the charging cradle. According to aspects of the invention, for guiding the charging flap, the charging cradle comprises at least one guide rail, which is arranged in the charging flap module integrated into the housing, so that it is protected against penetrating dirt and/or water. In other words, the guide rail is arranged in the charging flap module protected against dirt and/or water. The advantage is a functional charging flap module, the charging flap of which can be operated reliably regardless of weather and environmental conditions. If the guide rail were not incorporated in this way, soiling thereof could, for example, lead to jamming of the charging flap, whereby a plug element received in the charging flap module would not be secured or would possibly be inaccessible or not sufficiently accessible for a charging operation of the electric vehicle, for example.

With such an integrated guide rail, which is thus weather-resistant, a tolerance-optimized kinematics of a moving device of the charging flap can also be achieved, whereby a charging flap module that is still protected against environmental influences, and accordingly an electric vehicle that is protected from water and/or dirt possibly penetrating into a drive region of the electric vehicle can be brought about.

In one configuration of the electric vehicle according to aspects of the invention, the charging flap module comprises an upper cradle, wherein the charging flap can at least partially be arranged between the charging cradle and the upper cradle. Further protection of the guide rail formed on the charging cradle can thus be brought about.

Further improved protection against water and/or dirt penetrating into the charging flap module is achieved if the charging cradle comprises a sealant, which is designed to partially seal a cradle interior of the charging cradle, wherein the sealant is arranged along a vertical body axis of the body above the guide rail when the guide rail is arranged above the cradle opening and/or below the guide rail when the guide rail is arranged below the cradle opening. In other words, the sealant is to be attached such that at least the guide rail is formed between the sealant and the cradle interior, in particular the cradle opening.

In order to save costs and to reduce a number of components of the charging flap module, the guide rail is designed in one piece with the charging cradle. Preferably, the charging cradle is made of a plastic, wherein an injection molding process is further preferably used for the production of the charging cradle.

In a further configuration, the guide rail is open toward the body interior and fully closed in the direction facing away from the body interior. In other words, if a guide rail is used that is not solid but at least partially hollow, such as can be used for weight optimization, the guide rail is arranged with its closed side facing an environment so that in order to further secure operational reliability, water and/or dirt cannot enter the guide rail from the environment.

In particular, depending on a chosen production method of the charging flap, it may be advantageous for the charging flap module to include a cover element delimiting the charging cradle against the body interior. Parts of a moving device for moving the charging flap that are fully or at least partially protected against the body interior with the aid of the cover element can thus advantageously be arranged on the surface of the charging cradle facing the body interior. Likewise, a cover of the guide rail which is open toward the body interior can thus be achieved in a simple manner.

Advantageously, the guide rail comprises an additional sealant, which is arranged in the direction of a vertical body axis of the body at a bottom side of the guide rail. It may be possible that, depending on a positioning of the charging flap module on the body, an arrangement of the charging flap module inclined with respect to the vertical body axis results. In other words, the charging flap module need not necessarily be installed perpendicularly to a horizontal but has an incline. In this case, water or dirt could possibly run off on the outer skin via the possibly opened charging flap module, but the charging flap module is protected against penetrating water or dirt with the aid of an additional sealant.

In a further advantageous configuration of the electric vehicle, the charging flap module comprises a drain element designed to prevent dirt and/or water from penetrating into the charging cradle. Thus, further secured protection against dirt and/or water, in particular splash water and/or dust, penetrating into the charging cradle can be brought about.

One design of the charging flap module having two drain elements, wherein one of the two drain elements is arranged near a first side edge of the charging cradle and the other of the two drain elements is arranged near a second side edge facing away from the first side edge, secures water drainage in any vehicle position.

So-called water management of the charging flap module can thus be designed with the aid of the drain element without additional components, in particular if the drain element is produced, in particular inexpensively, in one piece having the charging cradle.

Another secure protection against penetrating dirt and/or water can be implemented if the drain element has an element wall on its element side facing away from the cradle opening.

Advantageously, the drain element comprises a drain channel for the secured drainage of water and/or dirt.

BRIEF DESCRIPTION OF THE DRAWINGS

Additional advantages, features and details of the invention arise from the following description of preferred exemplary embodiments and with reference to the drawing. The features and combinations of features mentioned above in the description and the features and combinations of features mentioned below in the description of the figures and/or shown alone in the figures can be used not only in the respectively indicated combination, but also in other combinations or on their own without departing from the scope of the invention. Here.

DETAILED DESCRIPTION OF THE INVENTION

Figure 1:
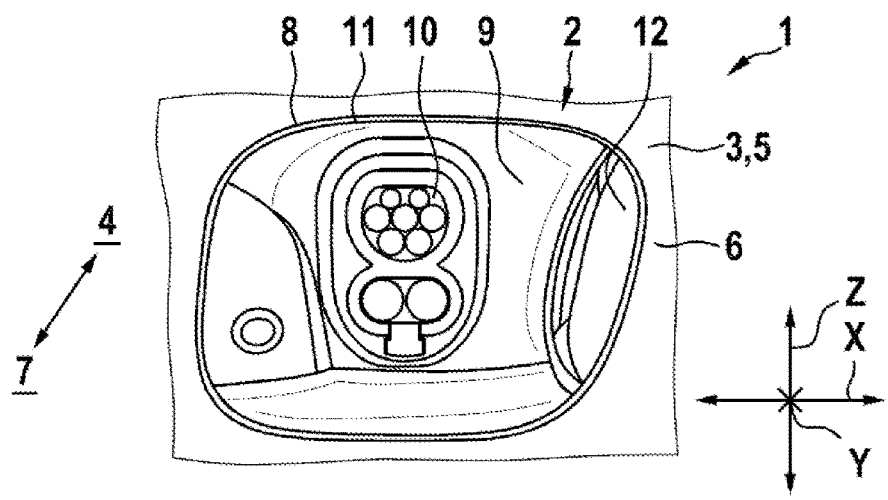
FIG. 1 shows a detail of an electric vehicle according to aspects of the invention having a charging flap module.

An electric vehicle 1 according to aspects of the invention having a charging flap module 2 is designed according to FIG. 1. The electric vehicle 1 has a body 3, which includes an interior.

In other words, the body 3 comprises a body interior 4. A body element 5 of the body 3 has an outer skin 6, which is thus designed to delimit the body 3 with respect to an environment 7. This body element 5 comprises an element opening 8 in which a charging cradle 9 of the charging flap module 2 is arranged, wherein an electrical outlet 10 is incorporated in the charging flap module 2 and is operatively connected to an electric drive of the electric vehicle 1, an electric motor. The electric vehicle 1 can be designed in the form of a solely battery-powered motor vehicle, or it can be designed in the form of a so-called hybrid vehicle, which can be operated with the aid of an internal combustion engine or an electric motor.

At this point, it should be mentioned that the body interior 4 is not necessarily understood to mean a passenger compartment. A space formed between side walls and front and rear walls of the body is to be understood as the body interior 4.

The charging cradle 9 is designed to be fixed to the body, wherein a cradle opening 11 formed in the charging cradle 9 can be opened or closed with the aid of a charging flap 12. That is to say, the charging flap 12 can be positioned between an open position and a closed position relative to the charging cradle 9 and can thus be moved, wherein two guide rails, a first guide rail 13 and a second guide rail 14, are formed for guiding the charging cradle 9. That is to say, the charging flap 12 is movably incorporated on the charging cradle 9.

For ease of understanding, at this point, a Cartesian coordinate system is introduced, which has extension directions of the body 3, wherein the body 3 extends along a longitudinal body axis X, a transverse body axis Y, and a vertical body axis Z. This means that in the present exemplary embodiment, the body element 5 is designed in the form of a side part of the body 3. It could also be designed as a rear part or front part of the body 3. This is usually dependent on an installation-space-dependent arrangement of the electric motor.

Figure 2:
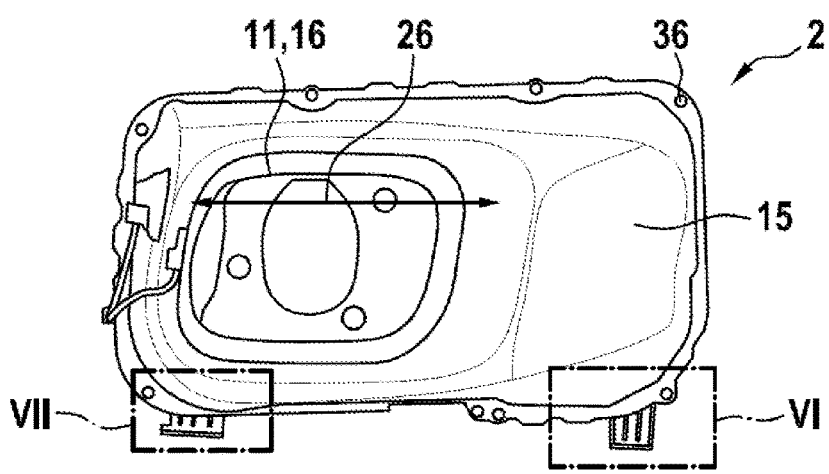
FIG. 2 shows a front side view of the charging flap module according to FIG. 1.

FIG. 2 shows the charging flap module 2 having an upper cradle 15 which has an upper cradle opening 16 and is designed to at least predominantly cover the charging cradle 9 with respect to the environment 7, wherein in order to completely cover the charging cradle 9 or in particular to cover the cradle opening 11, the charging flap 12 is arranged in its closed position to also close the upper cradle opening 16.

The charging flap 12, which is designed for moving the charging flap 12 with the aid of a moving device 17 including the two guide rails 13, 14, is preferably fixedly connected to a carriage 18 of the moving device 17, which carriage is movably incorporated in the first guide rail 13. In order to stabilize the movement of the charging flap 12, a gripper 19 is fastened to the charging flap 12 and is designed to at least partially encompass the second guide rail 14. The gripper 19 is designed to completely cover the second guide rail 14 in the direction of the environment 7. At this point, it should be mentioned that it is possible to guide the charging flap 12 with the aid of only one guide rail, preferably for reasons relating to the gravitational force of the first guide rail 13, and the carriage 18 at least partially incorporated in the guide rail 13; 14, but that tilting and/or jamming of the charging flap 12 may be avoided by stabilizing with the aid of a further guide rail, in the present exemplary embodiment the second guide rail 14, and the gripper 19 which at least partially encompasses the guide rail 14.

Figure 3:
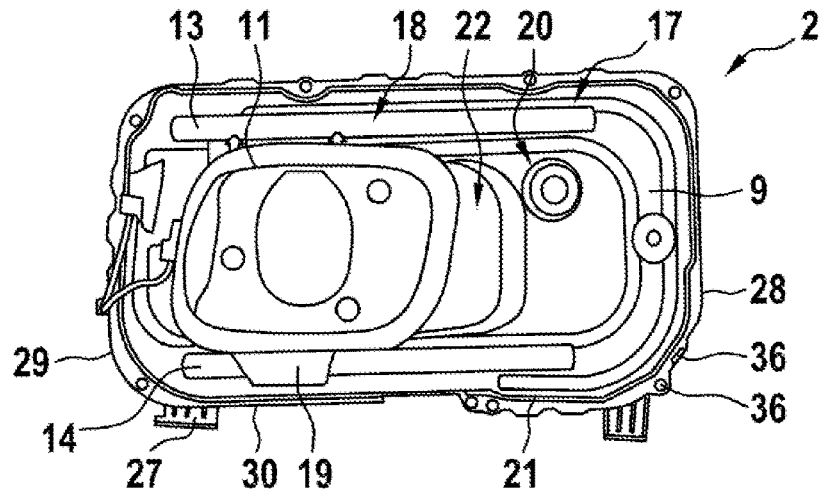
FIG. 3 shows a front side view of the charging flap module according to FIG. 2 without upper cradle.

FIG. 3 furthermore shows means 20 used to move the charging flap 12. The guide rails 13, 14 are formed on the charging cradle 9 so as to extend toward the environment 7 and, when assembled, are covered by the upper cradle 15 from the environment 7. The charging flap 12 can thus be move translationally between the upper cradle 15 and the charging cradle 9 in the present exemplary embodiment. In other words, for guiding the charging flap 12, the charging cradle 9 comprises at least one guide rail 13, which is arranged in the charging flap module 2 integrated into the housing, so that it is protected against penetrating dirt and/or water.

The charging cradle 9 has a sealant 21, which is arranged between the upper cradle 15 and the charging cradle 9 and is designed in the form of a sealing lip, which preferably completely seals the charging cradle 9 in the circumferential direction. The sealant 21 is formed along the vertical body axis Z above the first guide rail 13 and below the second guide rail 14 so that at least one cradle interior 22 comprising the element opening 8 is protected against the outside with the aid of the sealant 21. That is to say, the charging cradle 9 comprises the sealant 21, which is designed to partially seal the cradle interior 22, wherein the sealant 21 is arranged along the vertical body axis Z above the guide rail 14 when the guide rail 13 is arranged above the cradle opening 11, or below said guide rail when the guide rail 14 is arranged below the cradle opening 11.

Figure 4:
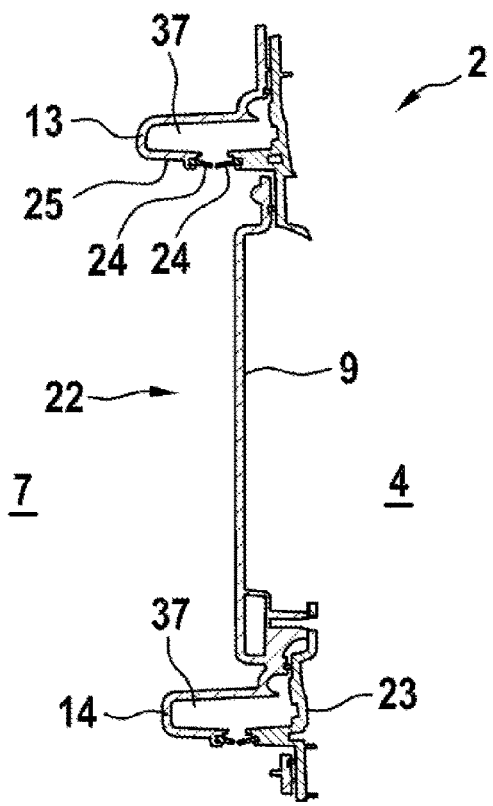
FIG. 4 shows a section of a charging cradle and a cover element of the charging flap module according to FIG. 2.
Figure 5:
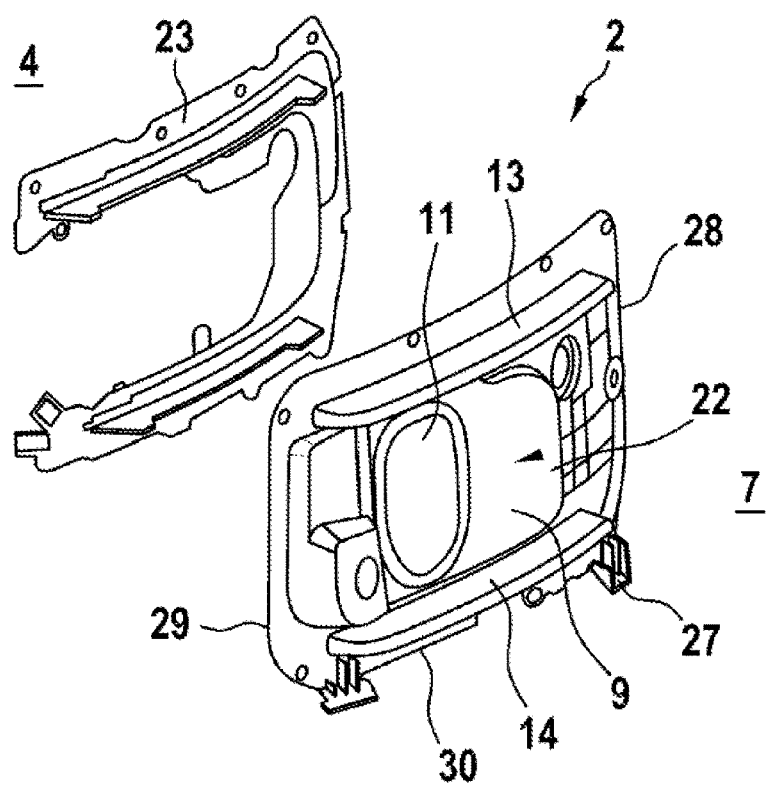
FIG. 5 shows an exploded view of the charging cradle and the cover element according to FIG. 4.

As can be seen in FIG. 4 in particular, the guide rails 13, 14 are designed in one piece with the charging cradle 9. The guide rails 13, 14 are open toward the body interior 4 and are fully closed in the direction facing away from the body interior 4, thus toward the environment 7. Preferably, the charging cradle 9, like the remaining, non-electric components of the charging flap module 2, is produced in an inexpensive injection molding process.

In order to cover the guide rails 13, 14, which are elevated toward the environment 7 and are hollow with respect to the body interior 4, a cover element 23 is provided, which is also produced in an inexpensive injection molding process and is designed to partially close the guide rails 13, 14. That is to further say, the charging flap module 2 includes the cover element 23 delimiting the charging cradle 9 against the body interior 4.

In order to prevent water and/or dirt or other things from penetrating into a cavity 37 of the guide rail 13; 14, an additional sealant 24 in the form of a sealing lip is formed between the guide rail 13; 14 and the cover element 23 and is arranged in the direction of the vertical body axis Z on a bottom side 25 of the guide rail 13; 14. The guide rails 13, 14 and the cover element 23 each comprise the additional sealant 24, wherein the opposing sealants 24 are designed to correspond to one another.

Depending on a design of the gripper 19, the second guide rail 14 could be completely closed with the aid of the cover element 23, but when using the moving device 17 with the carriage 19, a gap is necessarily to be provided between the guide rail receiving the carriage 19, in the present embodiment the first guide rail 13, so that the carriage 19 can be moved in the guide rail 13 over a travel path 26 of the charging flap 12.

Figure 6:
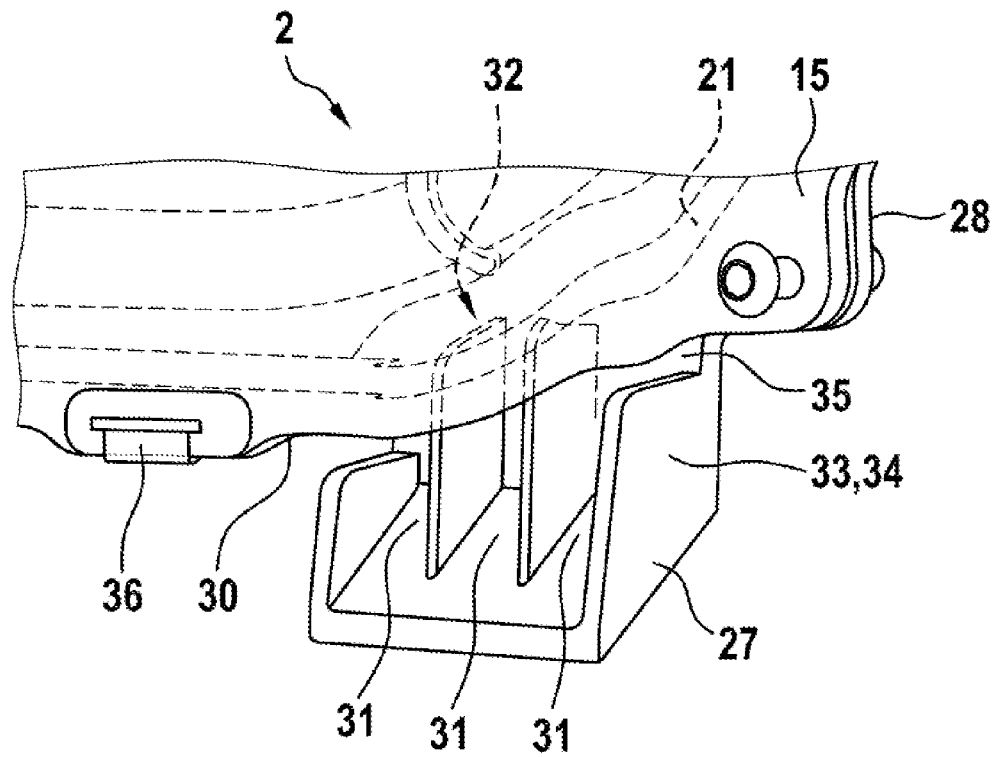
FIG. 6 shows a perspective detail view VI of a drain element of the charging flap module according to FIG. 2.
Figure 7:
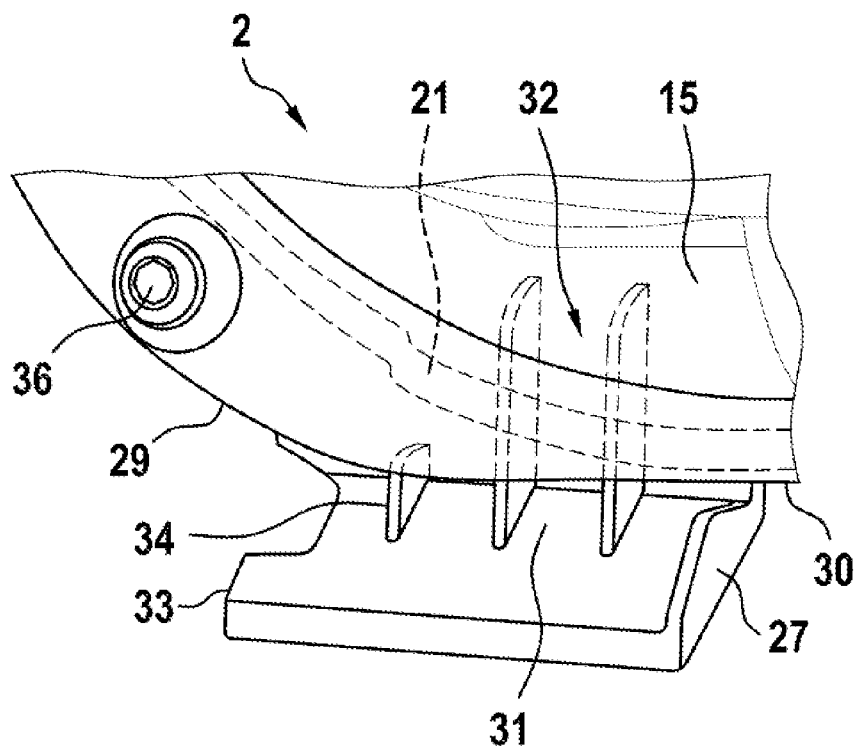
FIG. 7 shows a perspective detail view VII of a further drain element of the charging flap module according to FIG. 2.

The charging flap module 2 comprises a drain element 27, which is designed for draining water or the like, wherein the drain element 27 is designed to prevent dirt and/or water from penetrating into the charging cradle 9. In other words, not only can water or the like drain from the charging flap module 2 via the drain element 27, but the drain element 27 is designed in such a way that water or dirt or the like from the environment 7 also cannot penetrate into the charging flap module 2. The drain element 27 is designed in accordance with detail views VI and VII, which are illustrated in FIGS. 6 and 7.

The charging flap module 2 preferably comprises two drain elements 27, wherein one of the drain elements 27 is arranged near a first side edge 28 of the charging cradle 9 and the other of the two drain elements 27 is arranged near a second side edge 29 of the charging cradle 9 facing away from the first side edge 28. Such attachment of the drain elements 27 serves to ensure the function of the drain elements 27 in possible inclined positions of the electric vehicle 1, e.g., on a slope.

The drain elements 27 are formed along a vertical body axis Z below the guide rail 13; 14, in the present exemplary embodiment in which the charging flap module 2 has two guide rails 13, 14, also below the second guide rail 14 on a bottom edge 30 of the charging cradle 9.

The drain element 27 comprises a drain channel 31 for the secured drainage of water or dirt. The drain channel 31 is designed to extend into the cradle interior 11, wherein a channel gap 32 is formed in the region of the drain channel 31 between the sealant 21 and the charging cradle 9.

In order to prevent water or dirt from penetrating, the drain element 27 has, on its element side 33 facing away from the cradle opening 11, an element wall 34, which extends toward the upper cradle 15 to adjoin the latter, forming a functional gap 35. The drain element 27 is designed to be at least partially covered by the upper cradle 15.

The upper cradle 15 is connected to the charging cradle 9 with the aid of fasteners 36, wherein non-positive and positive connections in the form of, for example, clamping connections or screw connections are advantageous.

In terms of visual aspects, the electric vehicle 1 according to aspects of the invention comprises a charging flap module 2, which is designed to be in one piece with the outer skin 6 when viewed from the environment 7.

LIST OF REFERENCE SYMBOLS

1 Electric vehicle
2 Charging flap module
3 Body
4 Body interior
5 Body element
6 Outer skin
7 Environment
8 Element opening
9 Charging cradle
10 Electrical socket
11 Cradle opening
12 Charging flap
13 First guide rail
14 Second guide rail
15 Upper cradle
16 Upper cradle opening 17 Moving device
18 Carriage
19 Gripper
20 Means
21 Sealant
22 Cradle interior
23 Cover element
24 Additional sealant
25 Bottom side
26 Travel path
27 Drain element
28 First side edge
29 Second side edge
30 Bottom edge
31 Drain channel
32 Channel gap
33 Element side
34 Element wall
35 Functional gap
36 Fastener
37 Cavity
X Longitudinal body axis
Y Transverse body axis
Z Vertical body axis

What is claimed is:

1. An electric vehicle comprising:
a charging flap module including (i) a charging cradle having a charging flap and (ii) a drain element having a drain channel that is configured to prevent dirt and/or water from penetrating into the charging cradle; and
a body having a body interior, which has a body element having an outer skin, and wherein the body element has an element opening, in which the charging cradle is arranged,
wherein the charging cradle is configured to be fixed to the body,
wherein the charging flap is configured to be movable in a guided manner between an open position and a closed position for opening and closing a cradle opening of the charging cradle, and
wherein the charging cradle comprises at least one guide rail for guiding the charging flap, and which guide rail is arranged in the charging flap module so that the charging flap module is protected against penetrating dirt and/or water.

2. The electric vehicle according to claim 1, wherein the charging flap module comprises an upper cradle, and wherein the charging flap is configured to be positioned at least partially between the charging cradle and the upper cradle.

3. The electric vehicle according to claim 1, wherein the charging cradle comprises a sealant, which is configured to partially seal a cradle interior of the charging cradle, wherein the sealant is arranged along a vertical body axis (Z) of the body at a location that is (i) above the guide rail when the guide rail is arranged above the cradle opening, and/or (ii) below said guide rail when the guide rail is arranged below the cradle opening.

4. The electric vehicle according to claim 1, wherein the guide rail is configured in one piece with the charging cradle.

5. The electric vehicle according to claim 1, wherein the drain element is arranged along a vertical body axis (Z) of the body below the guide rail.

6. The electric vehicle according to claim 5, wherein the drain element is formed on a bottom edge of the charging cradle.

7. The electric vehicle according to claim 1, wherein the charging flap module comprises two of the drain elements, wherein one of the two drain elements is arranged near a first side edge of the charging cradle and the other of the two drain elements is arranged near a second side edge that faces away from the first side edge.

8. The electric vehicle according to claim 1, wherein the drain element comprises an element wall facing away from the cradle opening.

9. The electric vehicle according to claim 1, wherein the charging flap module comprises an upper cradle, wherein the charging flap is configured to be positioned at least partially between the charging cradle and the upper cradle, and wherein the drain element is configured to be at least partially covered by the upper cradle.

10. An electric vehicle comprising:
a charging flap module including a charging cradle having a charging flap; and
a body having a body interior, which has a body element having an outer skin, and wherein the body element has an element opening, in which the charging cradle is arranged,
wherein the charging cradle is configured to be fixed to the body,
wherein the charging flap is configured to be movable in a guided manner between an open position and a closed position for opening and closing a cradle opening of the charging cradle, and
wherein the charging cradle comprises at least one guide rail for guiding the charging flap, and which guide rail is arranged in the charging flap module so that the charging flap module is protected against penetrating dirt and/or water, and
wherein the guide rail is open toward the body interior and is fully closed in a direction facing away from the body interior.

11. The electric vehicle according to claim 1, wherein the charging flap module includes a cover element delimiting the charging cradle against the body interior.

12. An electric vehicle comprising:
a charging flap module including a charging cradle having a charging flap; and
a body having a body interior, which has a body element having an outer skin, and wherein the body element has an element opening, in which the charging cradle is arranged,
wherein the charging cradle is configured to be fixed to the body,
wherein the charging flap is configured to be movable in a guided manner between an open position and a closed position for opening and closing a cradle opening of the charging cradle, and
wherein the charging cradle comprises at least one guide rail for guiding the charging flap, and which guide rail is arranged in the charging flap module so that the charging flap module is protected against penetrating dirt and/or water,
wherein the guide rail comprises an additional sealant that is arranged along a vertical body axis (Z) of the body at a bottom side of the guide rail.

* * * * *